United States Patent
Sontakke et al.

(10) Patent No.: US 8,621,260 B1
(45) Date of Patent: Dec. 31, 2013

(54) SITE-LEVEL SUB-CLUSTER DEPENDENCIES

(75) Inventors: Alok Ashok Sontakke, Maharashtra (IN); Amit Haridas Rangari, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 305 days.

(21) Appl. No.: 12/915,196

(22) Filed: Oct. 29, 2010

(51) Int. Cl.
*G06F 11/07* (2006.01)

(52) U.S. Cl.
USPC .................. 714/4.11; 714/3; 714/6.3

(58) Field of Classification Search
USPC ................................. 714/4.11, 6.3
See application file for complete search history.

(56) References Cited

U.S. PATENT DOCUMENTS

| | | | |
|---|---|---|---|
| 5,555,177 A | 9/1996 | Simmons | |
| 6,609,213 B1 | 8/2003 | Nguyen et al. | |
| 6,728,896 B1 * | 4/2004 | Forbes et al. | 714/4.5 |
| 6,934,880 B2 | 8/2005 | Hofner | |
| 7,213,246 B1 * | 5/2007 | van Rietsc | 718/1 |
| 7,346,801 B2 | 3/2008 | Brunelle et al. | |
| 7,464,378 B1 * | 12/2008 | Limaye et al. | 718/100 |
| 7,631,066 B1 | 12/2009 | Schatz et al. | |
| 7,657,034 B2 | 2/2010 | Volp et al. | |
| 7,849,303 B2 | 12/2010 | Miller | |
| 7,933,869 B2 | 4/2011 | Becker et al. | |
| 8,185,776 B1 * | 5/2012 | Gentes et al. | 714/4.11 |
| 2003/0079100 A1 | 4/2003 | Williams et al. | |
| 2003/0097610 A1 | 5/2003 | Hofner | |
| 2004/0153711 A1 | 8/2004 | Brunelle et al. | |
| 2005/0120025 A1 * | 6/2005 | Rodriguez et al. | 707/10 |
| 2005/0132379 A1 * | 6/2005 | Sankaran et al. | 718/105 |
| 2005/0259572 A1 * | 11/2005 | Esfahany et al. | 370/217 |
| 2005/0268154 A1 | 12/2005 | Wipfel et al. | |
| 2005/0283641 A1 | 12/2005 | Clark et al. | |
| 2006/0047776 A1 * | 3/2006 | Chieng et al. | 709/217 |
| 2006/0085695 A1 * | 4/2006 | Shrivastava et al. | 714/47 |
| 2007/0016822 A1 * | 1/2007 | Rao et al. | 714/4 |
| 2007/0067318 A1 * | 3/2007 | Wolafka et al. | 707/100 |
| 2007/0133502 A1 * | 6/2007 | Osswald | 370/351 |
| 2007/0168507 A1 | 7/2007 | Das et al. | |
| 2008/0162622 A1 | 7/2008 | Becker et al. | |
| 2008/0162660 A1 | 7/2008 | Becker | |
| 2009/0006888 A1 * | 1/2009 | Bernhard et al. | 714/6 |
| 2009/0327311 A1 | 12/2009 | Becker | |
| 2009/0327798 A1 * | 12/2009 | D'Amato et al. | 714/4 |
| 2010/0125550 A1 | 5/2010 | Imamura et al. | |
| 2011/0041004 A1 | 2/2011 | Miwa et al. | |
| 2011/0106802 A1 * | 5/2011 | Pinkney et al. | 707/737 |
| 2011/0182184 A1 * | 7/2011 | Osswald | 370/236.2 |
| 2011/0225095 A1 * | 9/2011 | Gawali et al. | 705/300 |

* cited by examiner

*Primary Examiner* — Chae Ko
(74) *Attorney, Agent, or Firm* — Campbell Stephenson LLP

(57) ABSTRACT

Various systems and methods for implementing site-level sub-cluster dependencies are disclosed. One such method involves initiating failover of a first service group from a first cluster site to a second cluster site. The first service group includes one or more resources of an application. The method then identifies at least one dependent service group at the first cluster site. The dependent service group is either a parent or a child of the first service group. The method then involves initiating failover of the dependent service group from the first cluster site to the second cluster site.

18 Claims, 7 Drawing Sheets

SITE-LEVEL SUB-CLUSTER DEPENDENCIES

FIELD OF THE INVENTION

This invention relates clusters, in particular to dependencies between cluster elements and failover operations.

DESCRIPTION OF THE RELATED ART

Many of today's computing environments utilize clusters. In general terms, a cluster is a framework of interconnected independent computing systems that are managed as a group. Each computing system, or node, in the cluster runs its own operating system. The nodes in a cluster cooperate at the software level to provide increased availability to the hardware and software resources included in the cluster.

When a node or resource fails, other nodes can take predefined actions to restore availability of the failed node or resource. Configuring the predefined actions can be a challenging task, depending on the complexity of the cluster and the relationships between the various cluster elements.

SUMMARY OF THE INVENTION

Various systems and methods for implementing site-level sub-cluster dependencies are disclosed. One such method involves initiating failover of a first service group from a first cluster site to a second cluster site. The first service group includes one or more resources of an application. The method then identifies at least one dependent service group at the first cluster site. The dependent service group is either a parent or a child of the first service group. The method then involves initiating failover of the dependent service group from the first cluster site to the second cluster site.

In an embodiment, the dependent service group that is failed over includes all service groups at the first cluster site that are dependent on the first service group. In an embodiment, the first service group is hosted on one node, and the dependent service group is hosted on another node. In this embodiment, the first node and second node are based on heterogeneous platforms.

In an embodiment, the method also selects a suitable target node for the first service group and for the dependent service group. The method can also involve detecting an order in which to take the first service group and the dependent service group offline in the first cluster site and detecting an order in which to restart the first service group and the dependent service group in the second cluster site.

In an embodiment, the method also involves hosting a multi-tiered application in a cluster. In this embodiment, the first service group provides a first set of components of a first tier of the application, and the dependent service group provides as second set of components of a second tier of the application.

An example of a system can include one or more processors and memory coupled to the processors. The memory stores program instructions executable to perform a method such as the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
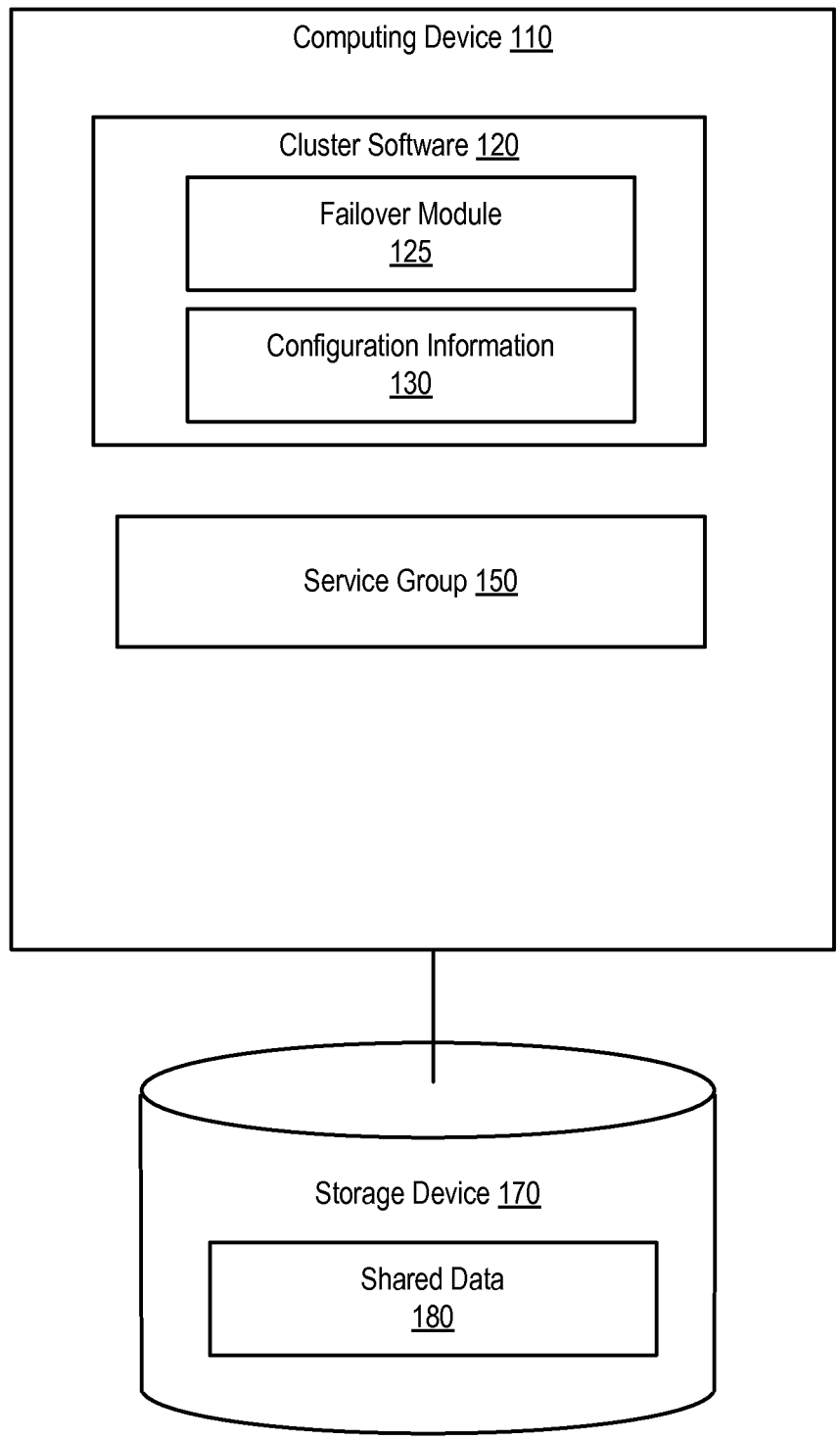
FIG. 1 is a block diagram of a computing device that includes a failover module, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Users depend on applications to perform tasks and provide services. An application can be configured to run in a cluster and to take advantage of the cluster's features. Such an application is known as a clustered application. The term application as used throughout the following description is intended to include the concept of a clustered application. An application is typically hosted on a single node, although applications can be hosted on multiple nodes. Hosting an application on multiple nodes can be particularly useful, for example, in an environment where multiple instances of an application can be simultaneously run. Such an environment can allow simultaneous, or shared, access to application data. One advantage a cluster can provide is that an application can be failed over from one node in a cluster to another node in the cluster transparently. That is, a user of the application is unaffected by and/or unaware that the application has failed over. Reasons for failover can include a hardware or software failure. For example, a failure in the node hosting the application, a hardware resource used by the application, or a software resource used by the application can cause the application to failover. Failover is typically done in such a way as to minimize any impact on the performance of the application.

A clustered application can include a number of hardware or software entities known as resources. Resources can include, for example, disk groups, file systems, network interface cards (NICs), IP addresses, and applications. Resources can be logically grouped into service groups. A service group includes some or all of the resources used to run a clustered application. This can include one or more than one resource. When a failover occurs, a service group is typically failed over in its entirety. That is, all resources in the service group are failed over as a group.

A cluster can be physically located in a single place, or site. For example, the systems on which the nodes of a cluster are implemented can be located in a single building. Alternatively, a cluster can span multiple sites. The term sub-cluster generally refers to the nodes physically located at a single site. A sub-cluster can also be a group of nodes within a set of nodes located at a single site. Communication within a sub-cluster is generally performed using high speed connections within or between nodes. Physical proximity allows for relatively fast network connections between nodes in the same site. Communication between sites is typically not as fast as communication within a site. Inter-site communication generally involves more complex switching and routing problems as well as additional bandwidth considerations. The type of link available between sites is another factor that can cause relatively slow rates of communication between sites as compared to communication within a site. When a service group is failed over, the service group can be taken offline and restarted on the same node, can be failed over to another node in the same site, or can be failed over to another node in a different site.

Multiple service groups can collaborate to provide a multi-tier application. A multi-tier application is an application that utilizes several service groups to provide various aspects of the application's functionality. Each tier of a multi-tier application can include one or more service groups. In one example, a multi-tier application includes three tiers. The first tier includes a service group that provides web access and is known as a web tier. A second tier includes a service group that provides business logic and is known as a middle tier. A third tier includes a service group that provides database access and functionality and is known as a database tier. The three service groups are dependent on one another and work together to provide the functionality of the multi-tier application to a user. For instance, a user can submit a request for data using features provided by the web tier service group. The request can be communicated by the business logic provided by the middle tier's service group to the database tier's service group. The database tier's service group can locate the requested data and communicate the requested data to the user through the middle tier service group and web tier service group. Thus, the three service groups communicate and work together to provide functionality associated with the multi-tier application.

Service groups of a multi-tier application can be hosted on a single node, on multiple nodes within a single site, or on multiple nodes in multiple sites. Because of the interaction between service groups of a multi-tier application, it is advantageous for all of the application's service groups to be hosted on nodes within a single site. This allows communication between the service groups to take advantage of the typically high communication speeds within a site.

When a fault is detected in a service group of a multi-tier application, one or more related service groups included in the multi-tier application may be taken offline. Once the faulted service group is brought back online (e.g., failed over to a different node), the related service groups can be brought back online. In some instances, the faulted service group is failed over to a node in a different site than the site in which the related service groups are hosted in. In this case, one service group of a multi-tier application is hosted in a different site than another service group of the multi-tier application. Having different service groups from a single multi-tier application hosted in different sites can have negative consequences on the performance of the multi-tier application. The multi-tier application may be unable to provide certain services, for example as a result of an inability to access information failed over to another site. Another consequence is degraded performance caused, for example, by increased latency in communications between service groups resulting from slower communications between sites.

When a service group is taken offline, and then brought back online, a determination is made as to which node of the cluster is to host the service group when the service group is brought back online. Typically, this determination is made using cluster configuration information and parameters. The cluster configuration can be specified, for example, by a cluster administrator. Typically, when possible, a service group is restarted on the same node the service group was hosted on prior to the service group being taken offline. This avoids the overhead of migrating the service group to another node. Of course, this may not be possible if the service group was taken offline as a result of a failure of the node hosting the service group. Other common factors in selecting which node is to host a service group include the performance characteristics of a node (e.g., memory, processor, storage capacity) and available bandwidth (e.g., how many other service groups the node already hosts). However, none of these factors addresses the performance issues discussed above that can arise from failing to consider which site other service groups of a given multi-tier application are hosted in. Failing to ensure that service groups of a multi-tier application are restarted in a single site after failover causes a risk of decreased performance of the application.

FIG. 1 is a block diagram of a computing device that includes a failover module, according to one embodiment. As shown, computing device includes cluster software 120, which includes failover module 125 and configuration information 130. Computing device 110 also includes service group 150. Computing device 110 is coupled to storage device 170, which includes shared data 180.

Computing device 110 can be any of a variety of different types of computing devices, including a server, personal computing device, laptop computer, net book, personal digital assistant, cellular phone, or the like. Computing device 110 can be a node in a cluster.

When acting as a node in a cluster, computing device 110 can host one or more service groups, such as service group 150. Service group 150 includes resources used by a clustered application (not shown). Such an application can be any of a variety of different types of software programs, including programs that act as servers (e.g., database management systems, file servers, backup servers, and the like) and programs that act as clients (e.g., email clients, web browsers, backup clients, and the like).

Service group 150 is one tier of a multi-tier application. As such, service group 150 can communicate with other service groups (not shown) included in the multi-tier application to provide functionality associated with the multi-tier application. Service group 150 accesses (e.g., reads and writes) shared data 180 in order to display, edit, transfer, or otherwise process the data stored therein.

Cluster software 120 manages service group 150. Cluster software 120 includes configuration information 130, which specifies dependencies between service group 150 and other service groups in a cluster.

Cluster software 120 also includes failover module 125. Failover module 125 can failover service group 150. If service group 150 is to be failed over, failover module 125 can take service group 150 offline, select a target node to host service group 150, and bring service group 150 back online on the target node. Failover module can detect whether other service groups that belong to the multi-tier application to which service group 150 belongs are hosted on nodes in the same site and ensure that the selected target node is located in the same site that hosts the other service groups in the multi-tier application. Failover module 125 can enforce a policy of failing over a service group to the same site other service groups of a multi-tier application are hosted in. Alternatively, failover module 125 can failover service group 150 to a target node that is not in the same site as the nodes that host the other service groups of the multi-tier application.

Failover module 125 can use additional criteria when selecting a target node for failing over a service group. For example, failover module 125 can select a node based on characteristics of the node, such as memory capacity, processor speed, network performance considerations, and the like, as well as on usage characteristics of the node, e.g., whether the node already hosts one or more service groups. In one embodiment, different tiers of a multi-tier application can be hosted on heterogeneous platforms. Furthermore, different service groups can be hosted on heterogeneous platforms, whether those service groups are part of the same tier or different tiers. For example, service group 150 can be hosted on a platform provided by Hewlett Packard, while another service group in the multi-tier application to which service group 150 belongs can be hosted on a platform provided by IBM, or Microsoft. Alternatively, service groups of a multi-tier application can be hosted on homogeneous nodes, or nodes that all use the same type of platform. When selecting a target node, a failover module can determine the type of platform the faulted service group is failing over from, and can select a target node with the same type of platform, or with a different type of platform.

Storage device 170 can include one or more of a variety of different storage devices, including hard drives, compact discs, digital versatile discs, solid state drive (SSD) memory such as Flash memory, and the like. Computing device 110 and storage device 170 can be integrated or separate. If separate, computing device 110 and storage device 170 can be coupled by a network such as the Internet or a storage area network.

Figure 2:
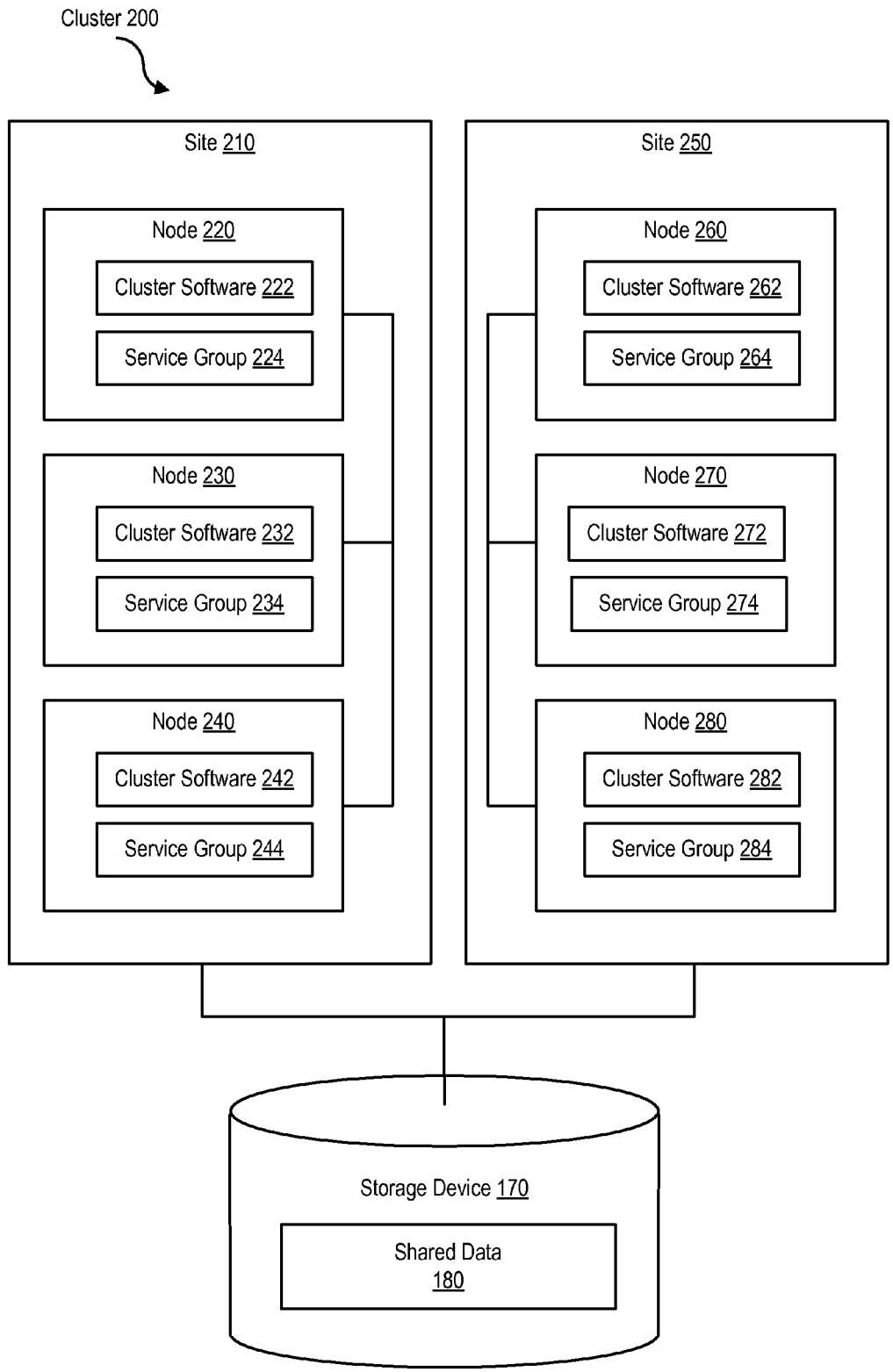
FIG. 2 is a block diagram of a cluster, according to one embodiment.

FIG. 2 is a block diagram of a cluster 200, according to one embodiment. Cluster 200 includes site 210. As shown, site 210 includes three nodes that each includes cluster software and a service group. A single node may host any number of service groups, each providing a discrete service to networked clients. If, for example, the node crashes, all service groups on that node are failed over to another node. A service group on one node in a site can fail over to a different node in the site or to a node in another site. Site 210 includes node 220, which includes cluster software 222 and service group 224, node 230, which includes cluster software 232 and service group 234, and node 240, which includes cluster software 242 and service group 244. Site 210 is coupled to site 250, which includes node 260, which includes cluster software 262 and service group 264, node 270, which includes cluster software 272 and service group 274, and node 280, which includes cluster software 282 and service group 284.

Each node in site 210 can be coupled to some or all of the other nodes in site 210. Typically, intra-site connections between nodes are high-speed connections. Sites 210 and 250 are also communicatively coupled. The connection between sites can be a network connection. In one embodiment, sites 210 and 250 are located in separate physical locations. Connections between such geographically remote sites can be slower than those used within a given site.

Sites 210 and 250 are shown coupled to storage device 170, which includes shared data 180. Shared data 180 can be accessed by nodes in both sites 210 and 250. In an embodiment, sites 210 and 250 are not connected to a common storage device, but each are connected to respective storage devices. In this embodiment, the storage devices can use replication technology to ensure that data can still be shared by the nodes in sites 210 and 250. There are numerous aspects of replication technology that are beyond the scope of this description. Generally, replication technology copies, transfers, or otherwise makes available a set of data from one storage area to another such that the data can be accessed by users of both storage areas.

Figure 3:
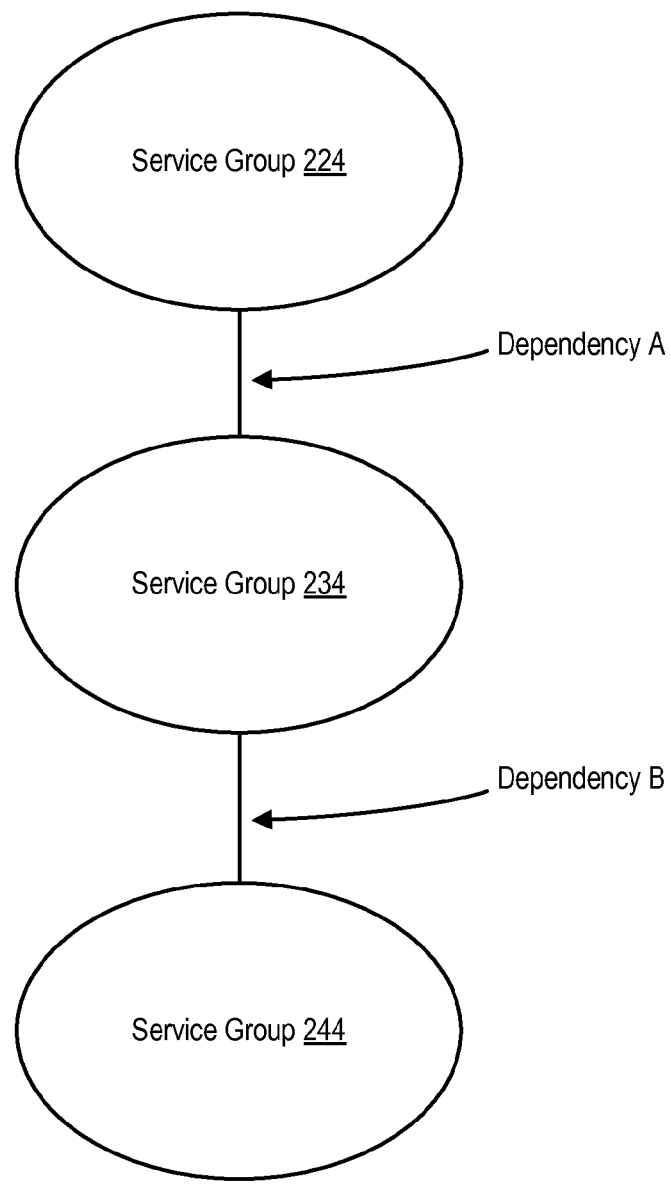
FIG. 3 is a diagram showing dependency relationships between several service groups, according to one embodiment.

FIG. 3 is a diagram showing dependency relationships between service groups 224, 234, and 244 from FIG. 2, according to one embodiment. In this embodiment, each service group makes up a tier in a multi-tier application. As noted above, a tier can include multiple service groups. In such an embodiment, a service group can have multiple child and/or parent service groups. The service groups can work together to provide functionality of the multi-tier application. As shown in FIG. 2, service groups 224, 234, and 244 are hosted in nodes in a single site.

Dependencies can exist between resources. These dependencies can be a result of, for example, application or operating system requirements. These dependencies can affect the order in which resources are brought online or taken offline. When a first service group includes a first resource that is dependent on a second resource in a second service group, the first service group is dependent upon the second service group. The first (dependent) resource is known as a parent resource and the second resource is known as a child resource. Similarly, the first (dependent) service group is known as a parent service group and the second service group is known as a child service group. In some cluster configurations, if a child service group fails, the parent service group is taken offline. Once the child service group is restarted (e.g., failed over to another node), the parent service group is restarted.

Service group 244 is a child service group of service group 234 and service group 234 is a parent service group of service group 244. Service group 234 is a child service group of service group 224 and service group 224 is a parent of service group 234. Service group 224 depends on service group 234 which depends on service group 244.

In one embodiment, three variations of dependency are supported: soft; firm; and hard. A soft dependency means that to bring online a parent service group, the child service group should be online in the same site. The child service group can be brought offline while the parent is online in the same site without bringing the parent service group offline.

Firm dependency means that to bring online the parent service group, the child service group should be online in the same site. The child service group cannot be brought offline while the parent is online in the same site without also bringing the parent service group offline. If the child service group faults then the parent service group is brought offline. The child service group can stay online even if the parent service group is brought offline.

Hard dependency means that to bring online the parent service group, the child service group should be online in the same site. The child service group cannot be brought offline while the parent is online in the same site without also bringing the parent service group offline. If the child service group faults then the parent service group is brought offline in the same site. If the parent service group faults then the child service group is brought offline in the same site.

Dependency not only specifies the order in which service groups are brought online and/or offline, but also specifies location information. For example, a dependency between a parent and child can specify that if a child fails over to a given site, the parent also fails over to the same given site. Determining a specified order and location for starting nodes can be performed in response to a user initiated action to start a multi-tier application, in addition to in response to detecting a fault. Dependencies are further illustrated in Table 1.

TABLE 1

Types of Dependencies

| Dependency | Parent Depends on . . . | Parent is Online If . . . | If Child Faults, then . . . | If Parent Faults, then . . . |
|---|---|---|---|---|
| Soft | Child online in same site. | Child is online in same site. | Parent stays online. | Child stays online. |
| Firm | Child online in same site. | Child is online in same site. | Parent taken offline. If Child fails over to another site, Parent migrates to the same site. If Child cannot fail over, Parent remains offline. | Child stays online. |
| Hard | Child online in same site. | Child is online in same site. | Parent taken offline before Child is taken offline. If Child fails over to another site, Parent migrates to same site. If Child cannot fail over, Parent remains offline. | Child taken offline. If Child fails over, Parent migrates to same site. If Child cannot fail over, Parent remains offline. |

Figure 4:
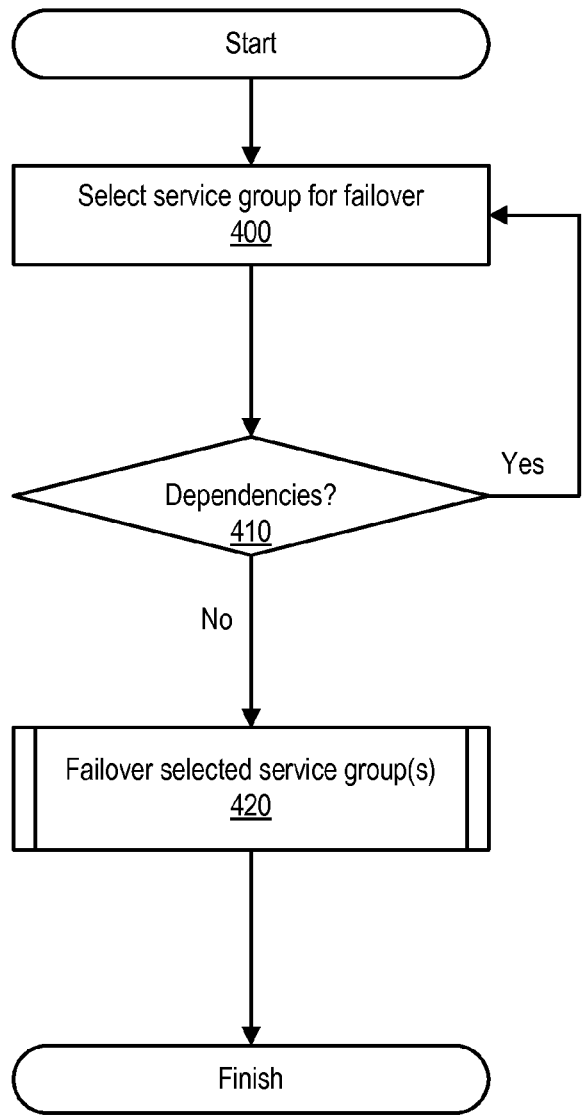
FIG. 4 is a flowchart of a method of performing a failover, according to one embodiment.

FIG. 4 is a flowchart of a method of performing a failover, according to one embodiment. The method can be performed by cluster software (e.g., cluster software 120 of FIG. 1) and related components, such as a failover module (e.g., failover module 125 of FIG. 1) and configuration information (e.g., configuration information 130 of FIG. 1).

The method begins at 400 when the failover module selects a service group for failover. The failover module can select a service group, for example, in response to detecting a fault with the node hosting the service group.

In response to selecting a service group for failover, the failover module detects, at 410, whether the service group has any dependencies. The failover module can access configuration information (e.g., configuration information 130 of FIG. 1) to detect the service group's dependencies. Detecting a service group's dependencies can include detecting whether any other service groups depend on the service group and/or whether the service group depends on any service groups. That is, detecting a service group's dependencies can include identifying one or more parent and/or child service groups of the service group. Detecting a given service group's dependencies can also include detecting dependencies of any parent or child service groups of the given service group. In one embodiment, the failover module identifies all service groups in a multi-tier application.

If the failover module identifies any parent or child service groups, the failover module selects the identified service group(s) for failover. For example, if a failover module detects a fault with a service group 244 of FIG. 3 the failover module selects service group 244 for failover. The failover module also detects whether service group 244 has any dependencies. In this example, service group 234 is a parent service group of service group 244, so the failover module also selects service group 234 for failover. The failover module also detects that service group 234 has a dependency, namely service group 224 is a parent service group of service group 234. Accordingly, the failover module selects service group 224 for failover as well. In this example, there are no other service groups dependent upon the selected service groups.

Detecting whether a service group has dependencies, or is included in a multi-tier application can involve accessing configuration information related to the service group, e.g., configuration information 130 of FIG. 1. The failover module can also detect the type of dependency, e.g., soft, firm, or hard, and configure the failover operation accordingly. The failover module fails over the selected service group(s) at 420. Failover is described in greater detail with regard to FIG. 5.

Figure 5:
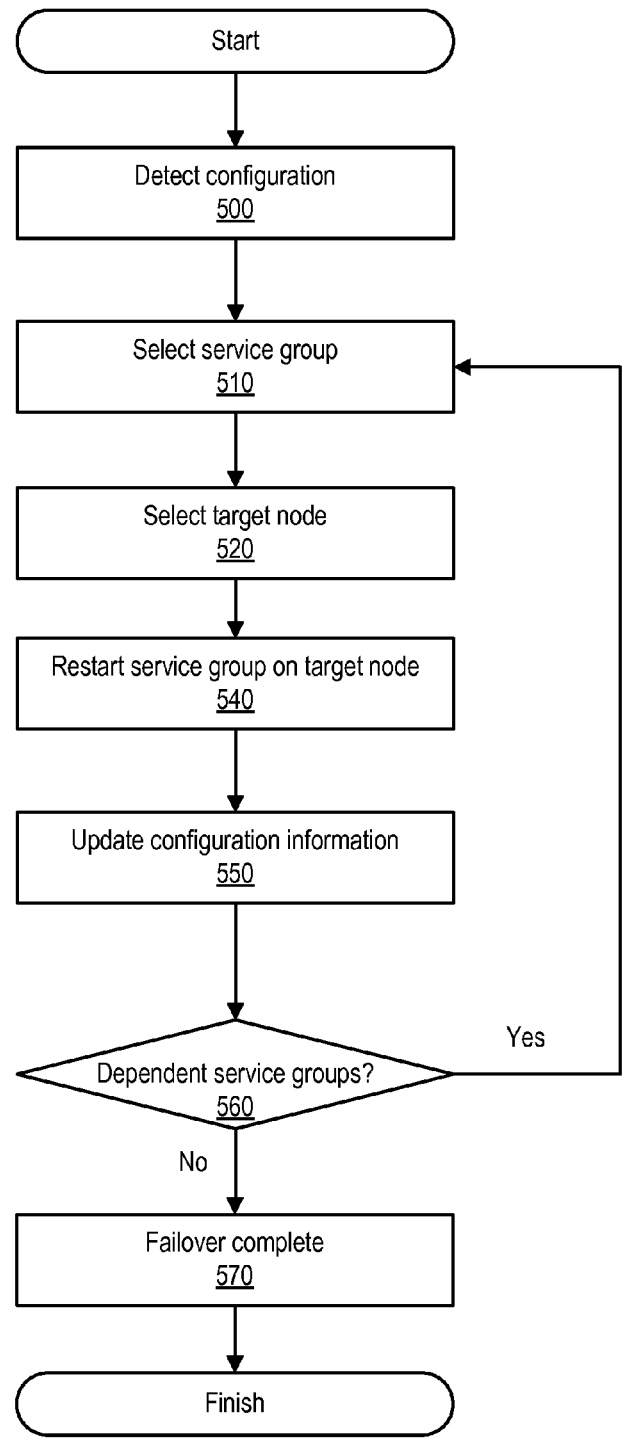
FIG. 5 is a flowchart of a method of completing a failover, according to one embodiment.

FIG. 5 is a flowchart of a method of completing a failover, according to one embodiment. The method begins at 500, when a failover module (e.g., failover module 125 of FIG. 1) detects configuration information related to service group that is to be failed over. The failover module can access configuration information (e.g., configuration information 130 of FIG. 1) to perform this operation.

Detecting configuration can involve determining an order in which to failover one or more service groups. This order can be based on the dependency relationships between service groups. For example, failover module can failover the lowest level service group first, then proceed up a hierarchy of dependent service groups. That is, first the lowest level child is failed over (e.g. service group 244 in FIG. 3) then a parent of that service group (e.g., service group 234 in FIG. 3) and then a parent of that service group (e.g., service group 224 in FIG. 3) until all service groups have been failed over At 510, the failover module selects a service group that has been identified as needing failed over based on the order determined in 500. Initially, the first service group in the determined order is selected. The failover module then, at 520 selects a target node which will host the service group after the failover operation. The target node can be selected based on requirements of the service group (e.g., hardware/software requirements) or location (e.g., site). For example, if failover module is selecting a target node for a parent service group having a child service group online in a first site, the failover module can determine the site in which the child service group is hosted and select a node in the same site.

At 540, the failover module restarts the service group on the selected target node. This can involve bringing the service group offline in a first node and then bringing the service group back online, either in the same node or a different node.

At 550, the failover module updates configuration information. Failover module can update the configuration information to reflect the current cluster topology, e.g., which service groups are hosted on which nodes in which sites.

At 560, the failover module detects whether there are any other service groups having dependencies with the selected service group. If so, the method returns to 510 and repeats. Otherwise, the failover module can signal that failover is complete at 570.

Figure 6:
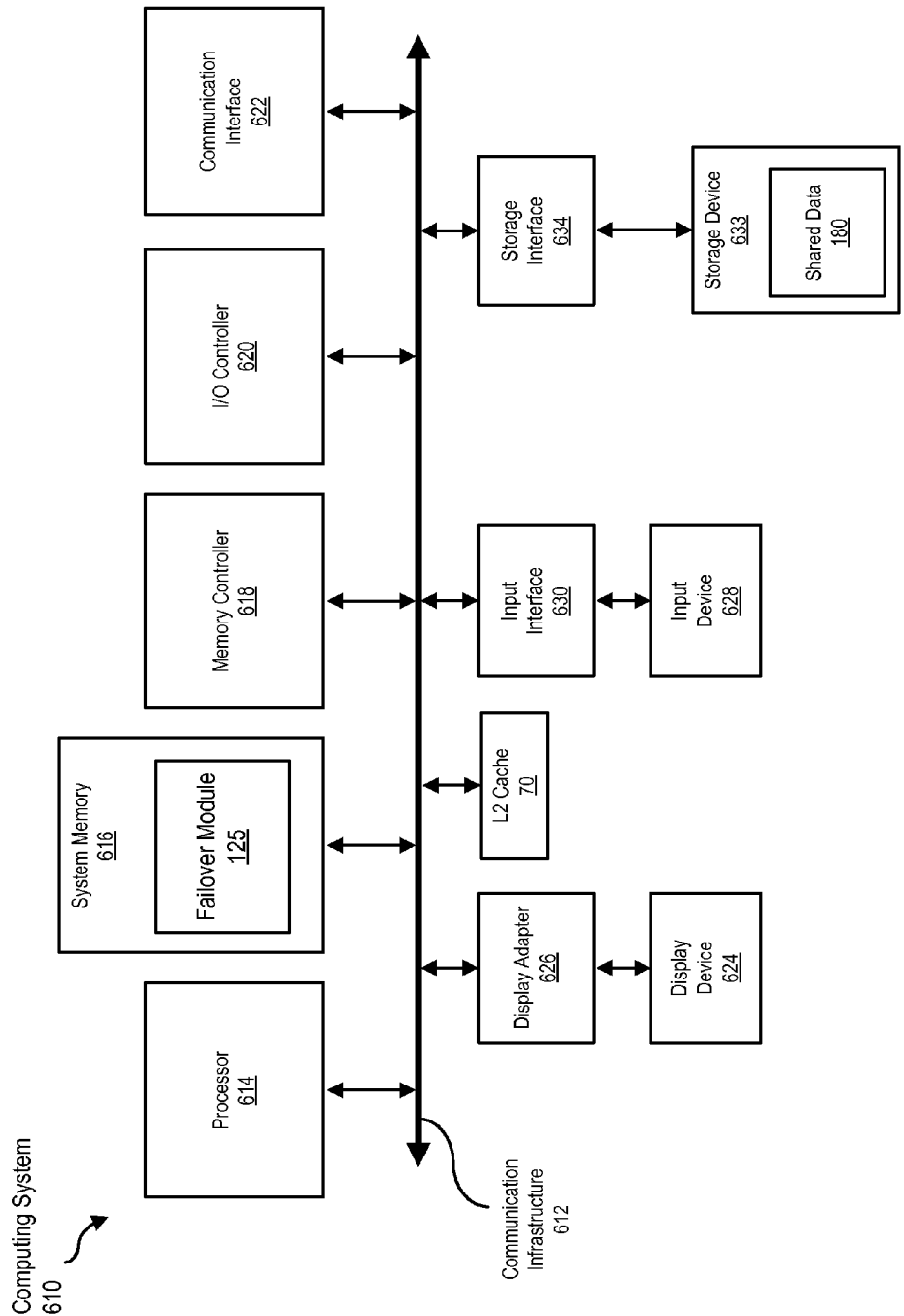
FIG. 6 is a block diagram of a computing device, illustrating how a failover module can be implemented in software, according to one embodiment.

FIG. 6 is a block diagram of a computing device, illustrating how a failover module can be implemented in software, according to one embodiment. Computing system 610 broadly represents any single or multi-processor computing device or system capable of executing computer-readable instructions. Examples of computing system 610 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 610 may include at least one processor 614 and a system memory 616. By executing the software that implements a failover module 125, computing system 610 becomes a special purpose computing device that is configured to provide improved performance of a clustered multi-tier application.

Processor 614 generally represents any type or form of processing unit capable of processing data or interpreting and executing instructions. In certain embodiments, processor 614 may receive instructions from a software application or module. These instructions may cause processor 614 to perform the functions of one or more of the embodiments described and/or illustrated herein. For example, processor 614 may perform and/or be a means for performing all or some of the operations described herein. Processor 614 may also perform and/or be a means for performing any other operations, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, storage device 633. In one example, a failover module 125 may be loaded into system memory 616.

In certain embodiments, computing system 610 may also include one or more components or elements in addition to processor 614 and system memory 616. For example, as illustrated in FIG. 6, computing system 610 may include an L2 cache 70 (e.g., an SSD memory device), a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the operations or features described and/or illustrated herein.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, computing system 610 may also include at least one input device 628 coupled to communication infrastructure 612 via an input interface 630. Input device 628 generally represents any type or form of input device capable of providing input, either computer or human generated, to computing system 610. Examples of input device 628 include, without limitation, a keyboard, a pointing device, a speech recognition device, or any other input device.

As illustrated in FIG. 6, computing system 610 may also include a storage device 633 coupled to communication infrastructure 612 via a storage interface 634. Storage device 633 generally represents any type or form of storage device or medium capable of storing data and/or other computer-readable instructions. For example, storage device 633 may include a magnetic disk drive (e.g., a so-called hard drive), a floppy disk drive, a magnetic tape drive, an optical disk drive, a flash drive, or the like. Storage interface 634 generally represents any type or form of interface or device for transferring data between storage device 633 and other components of computing system 610. A storage device like storage device 633 can store information such as shared data 180, as described above.

In certain embodiments, storage device 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 633 may also include other similar structures or devices for allowing computer software, data, or other computer-readable instructions to be loaded into computing system 610. For example, storage device 633 may be configured to read and write software, data, or other computer-readable information. Storage device 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6.

Computing system 610 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 610 for storage in memory via a network such as the Internet or upon a carrier medium.

The computer-readable medium containing the computer program may be loaded into computing system 610. All or a portion of the computer program stored on the computer-readable medium may then be stored in system memory 616 and/or various portions of storage device 633. When executed by processor 614, a computer program loaded into computing system 610 may cause processor 614 to perform and/or be a means for performing the functions of one or more of the embodiments described and/or illustrated herein. Additionally or alternatively, one or more of the embodiments described and/or illustrated herein may be implemented in firmware and/or hardware. For example, computing system 610 may be configured as an application specific integrated circuit (ASIC) adapted to implement one or more of the embodiments disclosed herein.

Figure 7:
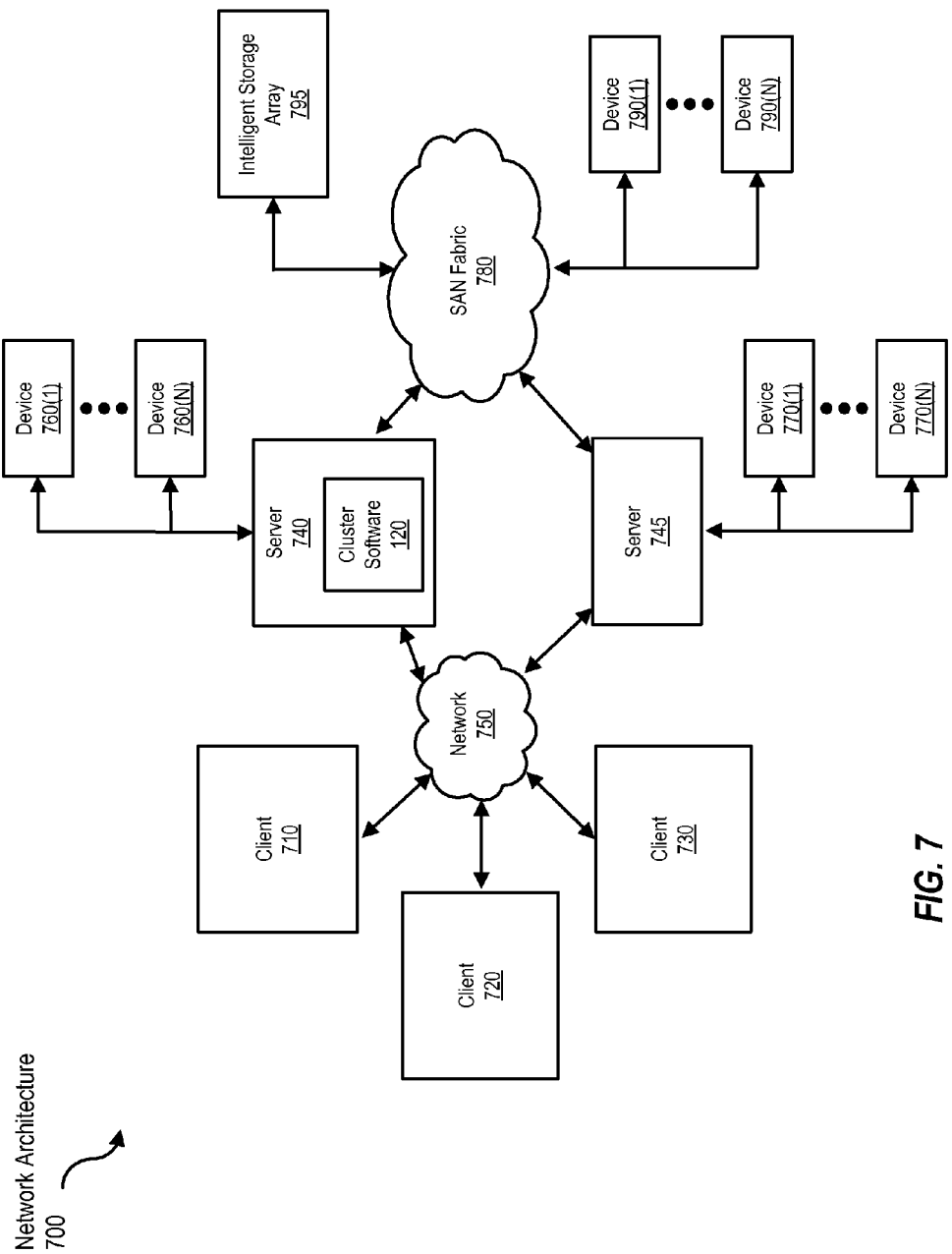
FIG. 7 is a block diagram of a networked system, illustrating how various computing devices can communicate via a network, according to one embodiment.

FIG. 7 is a block diagram of a network architecture 700 in which client systems 710, 720, and 730 and servers 740 and 745 may be coupled to a network 750. Client systems 710, 720, and 730 generally represent any type or form of computing device or system, such as computing system 410 in FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include failover module 125 as shown in FIGS. 1 and 6.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as Network File System (NFS), Server Message Block (SMB), or Common Internet File System (CIFS).

Servers 740 and 745 may also be connected to a storage area network (SAN) fabric 780. SAN fabric 780 generally represents any type or form of computer network or architecture capable of facilitating communication between multiple storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the embodiments disclosed herein may also be encoded as a computer program, stored in server 740, run by server 745, and distributed to client systems 710, 720, and 730 over network 750.

In some examples, all or a portion of the computing devices in FIGS. 6 and 7 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a failover module 125 in FIG. 1 may transform configuration information of a cluster by updating the configuration to reflect the physical locations hosting various service groups.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    initiating failover of a first service group from a first cluster site to a second cluster site, wherein
        the first service group is one of a plurality of service groups associated with a multi-tier application, and
        each service group of the plurality of service groups comprises a respective set of components associated with a respective tier of the multi-tier application,
        the first cluster site is geographically remote from the second cluster site, and
        the first service group comprises one or more resources of a first tier of the multi-tier application;
    identifying at least one dependent service group at the first cluster site, wherein
        the at least one dependent service group is one of a parent or child of the first service group;
    initiating failover of the at least one dependent service group from the first cluster site to the second cluster site.

2. The method of claim 1, wherein
    the at least one dependent service group comprises all service groups at the first cluster site that are dependent on the first service group.

3. The method of claim 1, wherein
    the first service group is hosted on a first node,
    the at least one dependent service group is hosted on a second node, and
    the first node and second node are heterogeneous.

4. The method of claim 1, further comprising:
    selecting a suitable target node for the first service group; and
    selecting a suitable target node for the at least one dependent service group.

5. The method of claim 1 further comprising:
    detecting an order in which to take the first service group and the at least one dependent service group offline in the first cluster site.

6. The method of claim 1 further comprising:
    detecting an order in which to restart the first service group and the at least one dependent service group in the second cluster site.

7. The method of claim 1, further comprising:
    determining a type of dependency, of a plurality of types of dependency, that exists between the dependent service group and the first service group, wherein the failover is initiated based on the type of dependency.

8. A computer readable storage medium comprising program instructions executable to:
    initiate failover of a first service group from a first cluster site to a second cluster site, wherein
        the first service group is one of a plurality of service groups associated with a multi-tier application,
        each service group of the plurality of service groups comprises a respective set of components associated with a respective tier of the multi-tier application,
        the first cluster site is geographically remote from the second cluster site, and
        the first service group comprises one or more resources of a first tier of the multi-tier application;
    identify at least one dependent service group at the first cluster site, wherein
        the at least one dependent service group is one of a parent or child of the first service group;
    initiate failover of the at least one dependent service group from the first cluster site to the second cluster site.

9. The computer readable storage medium of claim 8, wherein
    the at least one dependent service group comprises all service groups at the first cluster site that are dependent on the first service group.

10. The computer readable storage medium of claim 8, wherein
    the first service group is hosted on a first node,
    the at least one dependent service group is hosted on a second node, and
    the first node and second node are heterogeneous.

11. The computer readable storage medium of claim 8, wherein the program instructions are further executable to:
    select a suitable target node for the first service group; and
    select a suitable target node for the at least one dependent service group.

12. The computer readable storage medium of claim 8, wherein the program instructions are further executable to:
    detect an order in which to take the first service group and the at least one dependent service group offline in the first cluster site.

13. The computer readable storage medium of claim 8, wherein the program instructions are further executable to:
    detect an order in which to restart the first service group and the at least one dependent service group in the second cluster site.

14. A system comprising:
    one or more processors; and
    a memory coupled to the one or more processors, wherein the memory stores program instructions executable by the one or more processors to:
    initiate failover of a first service group from a first cluster site to a second cluster site, wherein
        the first service group is one of a plurality of service groups associated with a multi-tier application,
        each service group of the plurality of service groups comprises a respective set of components associated with a respective tier of the multi-tier application,
        the first cluster site is geographically remote from the second cluster site, and
        the first service group comprises one or more resources of a first tier of the multi-tier application;
    identify at least one dependent service group at the first cluster site, wherein
        the at least one dependent service group is one of a parent or child of the first service group;
    initiate failover of the at least one dependent service group from the first cluster site to the second cluster site.

15. The system of claim 14, wherein
the at least one dependent service group comprises all service groups at the first cluster site that are dependent on the first service group.

16. The system of claim 14, wherein
the first service group is hosted on a first node,
the at least one dependent service group is hosted on a second node, and
the first node and second node are heterogeneous.

17. The system of claim 14, wherein the program instructions are further executable to:
select a suitable target node for the first service group; and
select a suitable target node for the at least one dependent service group.

18. The system of claim 14, wherein the program instructions are further executable to:
detect an order in which to take the first service group and the at least one dependent service group offline in the first cluster site; and
detect an order in which to restart the first service group and the at least one dependent service group in the second cluster site.

* * * * *